United States Patent
Kecicioglu et al.

(10) Patent No.: US 10,952,252 B2
(45) Date of Patent: Mar. 16, 2021

(54) SYSTEMS AND METHODS FOR COORDINATED MULTI POINT OPERATION IN THE UNLICENSED BAND

(71) Applicant: CABLE TELEVISION LABORATORIES, INC, Louisville, CO (US)

(72) Inventors: Balkan Kecicioglu, Erie, CO (US); Dorin Gheorghe Viorel, Erie, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 1 day.

(21) Appl. No.: 16/058,701

(22) Filed: Aug. 8, 2018

(65) Prior Publication Data
US 2019/0053278 A1 Feb. 14, 2019

Related U.S. Application Data

(60) Provisional application No. 62/542,510, filed on Aug. 8, 2017, provisional application No. 62/542,522, filed on Aug. 8, 2017.

(51) Int. Cl.
*H04W 74/08* (2009.01)
*H04L 5/00* (2006.01)
(Continued)

(52) U.S. Cl.
CPC .......... *H04W 74/0816* (2013.01); *H04B 7/02* (2013.01); *H04L 5/0035* (2013.01);
(Continued)

(58) Field of Classification Search
CPC ..... H04B 7/02; H04L 27/0006; H04L 5/0035; H04L 5/0048; H04L 5/0055; H04W 28/16;
(Continued)

(56) References Cited

U.S. PATENT DOCUMENTS

| | | | |
|---|---|---|---|
| 9,236,916 B2* | 1/2016 | Wernersson | H04B 7/0619 |
| 10,411,852 B2* | 9/2019 | Agiwal | H04L 5/0037 |

(Continued)

FOREIGN PATENT DOCUMENTS

CN 102291737 B * 1/2014 ............ H04W 48/20

*Primary Examiner* — Un C Cho
*Assistant Examiner* — Shah M Rahman
(74) *Attorney, Agent, or Firm* — Armstrong Teasdale LLP

(57) ABSTRACT

A wireless communications system provides coordinated multi point transmission over a channel of a wireless transmission medium. The system includes a central controller having a processor and a memory, a first cell region having a first communications node disposed therein, and a plurality of neighboring cell regions disposed about the first cell region. Each of the plurality of neighboring cell regions includes a second communications node disposed therein. The system includes a plurality of user equipment devices disposed within an overlapping region of the first cell region and one of the neighboring cell regions. The central controller is configured to assign the first communications node to be an anchor transmission point of a coordinated set of transmission points. The anchor transmission point is configured to perform carrier sensing on the channel. The coordinated set of transmission points includes the first communications node and at least one second communications node.

13 Claims, 10 Drawing Sheets

(51) Int. Cl.
*H04L 27/00* (2006.01)
*H04B 7/02* (2018.01)
*H04W 88/08* (2009.01)
*H04W 28/16* (2009.01)

(52) U.S. Cl.
CPC .......... *H04L 5/0048* (2013.01); *H04L 5/0055* (2013.01); *H04L 27/0006* (2013.01); *H04W 74/0808* (2013.01); *H04W 28/16* (2013.01); *H04W 88/08* (2013.01); *H04W 88/085* (2013.01)

(58) Field of Classification Search
CPC ......... H04W 74/0808; H04W 74/0816; H04W 88/08; H04W 88/085; H04W 88/12
USPC ........................................................ 370/329
See application file for complete search history.

(56) References Cited

U.S. PATENT DOCUMENTS

| | | | | |
|---|---|---|---|---|
| 2011/0034163 | A1* | 2/2011 | Zhu | H04B 7/022 455/422.1 |
| 2011/0103287 | A1* | 5/2011 | Ma | H04B 7/024 370/312 |
| 2014/0044061 | A1* | 2/2014 | Yue | H04L 1/0077 370/329 |
| 2014/0066085 | A1* | 3/2014 | Sun | H04W 72/082 455/454 |
| 2014/0185496 | A1* | 7/2014 | Wolf | H04W 92/045 370/294 |
| 2014/0192744 | A1* | 7/2014 | Zhou | H04B 7/0626 370/329 |
| 2014/0335876 | A1* | 11/2014 | Ratasuk | H04W 74/0816 455/450 |
| 2015/0009966 | A1* | 1/2015 | Lee | H04L 5/0035 370/336 |
| 2015/0085763 | A1* | 3/2015 | Gao | H04B 7/0417 370/329 |
| 2015/0117380 | A1* | 4/2015 | Zhang | H04B 7/024 370/329 |
| 2015/0146680 | A1* | 5/2015 | Luo | H04B 7/0452 370/330 |
| 2015/0188680 | A1* | 7/2015 | Li | H04W 28/0278 370/329 |
| 2016/0345360 | A1* | 11/2016 | Papaleo | H04W 74/08 |
| 2016/0374059 | A1* | 12/2016 | Park | H04L 27/0006 |
| 2017/0295502 | A1* | 10/2017 | Stirling-Gallacher | H04W 56/001 |
| 2017/0295508 | A1* | 10/2017 | Stirling-Gallacher | H04L 5/0048 |
| 2017/0331577 | A1* | 11/2017 | Parkvall | H04L 5/1469 |
| 2018/0013522 | A1* | 1/2018 | Liu | H04L 5/0055 |
| 2018/0027580 | A1* | 1/2018 | Yoo | H04W 28/0236 370/230 |
| 2018/0175923 | A1* | 6/2018 | Liang | H04W 24/10 |
| 2018/0242163 | A1* | 8/2018 | Patel | H04L 5/006 |
| 2019/0053274 | A1* | 2/2019 | Kim | H04L 5/0044 |
| 2019/0059046 | A1* | 2/2019 | Virtej | H04W 74/0808 |
| 2019/0230569 | A1* | 7/2019 | Kim | H04W 36/30 |

* cited by examiner

SYSTEMS AND METHODS FOR COORDINATED MULTI POINT OPERATION IN THE UNLICENSED BAND

CROSS REFERENCE TO RELATED APPLICATIONS

This application claims the benefit of and priority to U.S. Provisional Patent Application Ser. No. 62/542,510, filed Aug. 8, 2017, and U.S. Provisional Patent Application Ser. No. 62/542,522, filed Aug. 8, 2017, both of which are incorporated herein by reference in their entireties.

BACKGROUND

The field of the disclosure relates generally to management of wireless communications, and more particularly, to wireless communications operating in the unlicensed band.

Some conventional wireless communication systems utilize the unlicensed shared spectrum. For example, the 2.4 GHz, 3.5 and 5 GHz frequency bands are presently used for Wi-Fi, Bluetooth, Zigbee, and a range of other consumer, industrial, and medical wireless technologies. Other technology platforms share the spectrum in other frequency ranges, and available wireless spectra are becoming more intensively shared as demand for wireless technology increases. Some of the conventional technologies operating in the unlicensed spectrum utilize algorithm-based and sensing-based distributed access, which enable common use of a wireless resource, despite a lack of active coordination among users. For example, typical Wi-Fi systems employ a carrier sense multiple access with collision avoidance (CSMA/CA) network multiple access method, which is also known as "listen-before-talk" (LBT), in which carrier sensing is used, and in which network nodes attempt to avoid collisions by transmitting only when the channel is sensed to be idle (i.e., not being used). The CSMA/CA protocol typically operates in the data link layer of the telecommunication model of the network.

Wi-Fi devices employ a common, standards-based protocol to avoid interference among themselves and other users, which provides a substantially equal probability of access across all users in channel conditions. Conventional Wi-Fi devices, as well as newer technologies such as Long Term Evolution (LTE), LTE Licensed Assisted Access (LAA), and MuLTEfire, have recently adopted the CSMA/CA scheme as a mechanism for medium access control (MAC). In this conventional implementation, a transmitter/transceiver of a first node defers its transmission when another, second node is detected, and applies an additional back off time before starting its own transmission. During this back off time, the first node monitors the channel and performs clear channel assessment (CCA). If the channel is not busy at the end of this period, the transmitter/transceiver of the first node initiates transmission. The first transmitting node then monitors the environment using a uniform beam-pattern, listening for transmissions from all directions.

Nevertheless, these newer LTE-based technologies do not employ the cooperative techniques within the shared spectrum that are used by Wi-Fi devices. LTE-based technologies are known to interfere with Wi-Fi-based technologies, when operating in the same unlicensed spectrum and same geographical location, due to the centralized architecture of LTE and mobile systems where spectrum access is scheduled by the core network, instead of being coordinated with other access technologies accessing the same spectrum resources. Mobile technologies utilizing LTE may dominate the access to a shared unlicensed spectrum without regard to other wireless access technologies. These non-cooperative mobile technologies can be implemented in an aggressive manner that utilizes a disproportionate share of airtime, as compared with cooperative technologies.

Moreover, a new generation of LTE-based technologies are being presently proposed for the unlicensed bands, including as 3GPP LTE eLAA and MuLTEfire. These new technologies also use carrier sensing multiple access (CSMA), similar to Wi-Fi, and leverage existing LTE features for operation in the unlicensed bands. One technique for leveraging LTE with in a wireless communication network is known as Coordinated Multi Point (CoMP), which is a multiple antenna transmission method used to improve performance of mobile users/user equipment located at the edge of a cell of the network. CoMP, however, is limited by the inability to reuse particular LTE features due to specific regulatory requirements in the unlicensed band.

Accordingly, it is desirable to provide systems and methods capable of fully leveraging existing capabilities of LTE communication systems, and particularly with to the rapidly-developing migration to 5G networks, including 3GPP 5G New Radio (NR).

BRIEF SUMMARY

In an embodiment, a wireless communications system is provided for coordinated multi point transmission over at least one channel of a wireless transmission medium. The system includes a central controller having at least one processor and a memory, a first cell region having a first communications node disposed therein, and a plurality of neighboring cell regions disposed about the first cell region. Each of the plurality of neighboring cell regions includes a second communications node disposed therein. The system further includes a plurality of user equipment devices disposed within an overlapping region of the first cell region and at least one of the plurality of neighboring cell regions. The central controller is configured to assign the first communications node to be an anchor transmission point of a coordinated set of transmission points. The anchor transmission point is configured to perform carrier sensing on the at least one channel. The coordinated set of transmission points includes the first communications node and at least one second communications node.

In an embodiment, a method is provided for coordinating multi point transmission over at least one channel of a wireless transmission medium. The method is performed by a central controller of a wireless communication system. The method includes a step of forming a coordinated multi point set of transmission points. The coordinated multi point set of transmission points includes at least a central node and one or more neighboring nodes. The method further includes a step of performing, by at least one transmission point of the coordinated multi point set, a clear channel assessment of the at least one channel. The method further includes a step of transmitting, by the at least one transmission point, results of the step of performing to the central controller. The method further includes a step of indicating, by the central controller to all transmission points of the coordinated multi point set, that the at least one channel is cleared for transmission. The method further includes a step of coordinating, after the step of indicating, transmissions in the at least one channel by each of the transmission points of the coordinated multi point set. The method further includes a step of receiving feedback information from at least one user equipment device serviced by the at least one transmission point.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1:
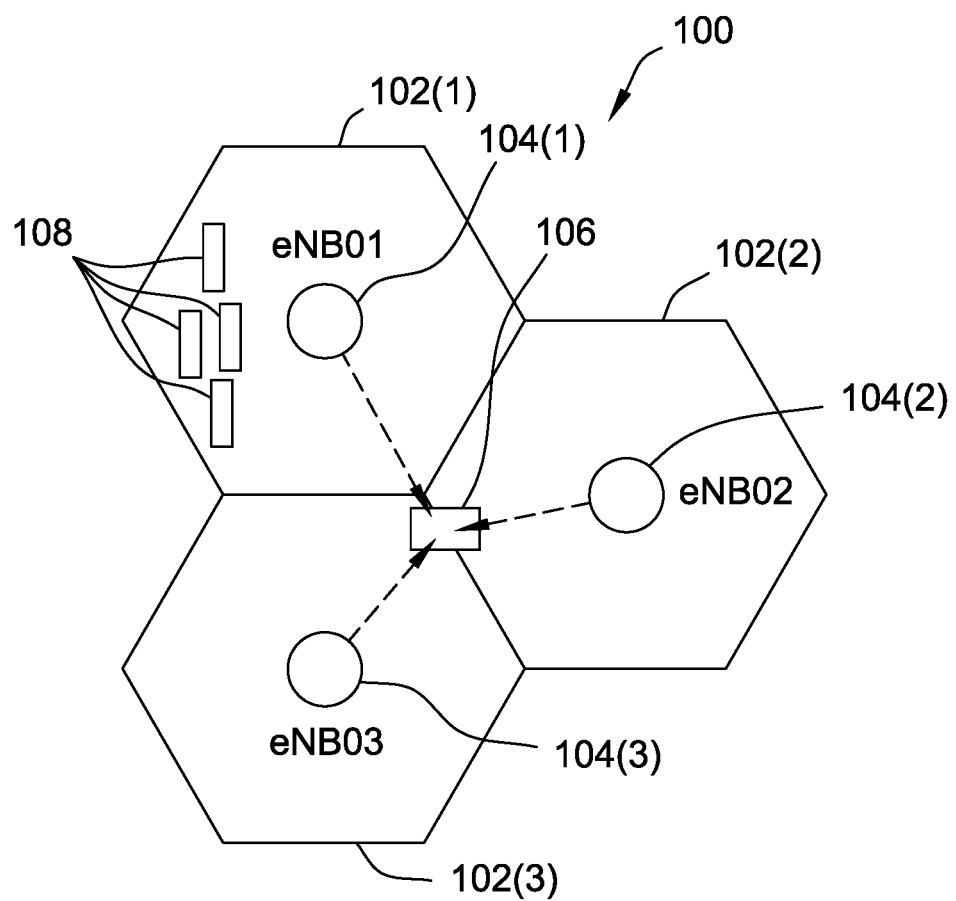
FIG. 1 is a schematic illustration of a communication system implementing inter-cell coordination, in accordance with an embodiment.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As described herein, "user equipment," or UE, refers to an electronic device or system utilizing a wireless technology protocol, such as LTE, unlicensed LTE (LTE-U), LTE WLAN Aggregation (LWA), or Worldwide Interoperability for Microwave Access (WiMAX, e.g., IEEE 802.16 protocols). Additionally, "Wi-Fi device" refers to an electronic device, such as a station (or STA), that has the capability to access and implement one or more existing IEEE 802.11 protocols. For example, a UE may include, without limitation, a mobile handset or similar device that implements an LTE transmission, and a Wi-Fi device may include, without limitation, one or more of a laptop, a desktop personal computer (PC), personal digital assistant (PDA), AP, and a Wi-Fi phone/smartphone. A UE or Wi-Fi device may be fixed, mobile, or portable, and may further include a transceiver or transmitter/receiver combination. A UE and a Wi-Fi device may be separate devices, or may be a single device with both LTE and Wi-Fi capability, and which includes a MAC layer and physical layer (PHY) interface that is both IEEE 802.11-conformant and IEEE 802.16-conformant to a wireless medium.

In exemplary embodiments, each of the following CoMP systems and methods may be implemented alone, or in combination with one or more features of the other embodiments. In some embodiments, where processes are described, the several steps thereof may be implemented simultaneously, in succession, or in a different order where permitted. In the following examples, CoMP systems are illustrated and described with respect to transmissions from/to base stations (BS)/macro BSs and remote radio heads (RRH). These advantageous embodiments are described further below with respect to several drawings.

More particularly, the following description relates to systems and methods for implementing CoMP transmission in the unlicensed band. In an exemplary embodiment, a single transmission point performs LBT to clear the channel and obtain a transmission opportunity (TxOP) before sending a short initial transmission. UEs in the vicinity may then reply with an immediate acknowledgement message (ACK) to the initial transmission. Other transmission points are thus enabled to align their own transmissions by listening to the ACK transmissions from the several UEs, which in turn enable the other transmission points to immediately start coordinated transmission.

CoMP Transmission and Macro Base Stations

FIG. 1 is a schematic illustration of a communication system 100 implementing inter-cell coordination. System 100 includes a plurality of adjacent cells 102, and each cell 102 includes a respective base station 104. In an exemplary embodiment, system 100 is a radio access network, and base stations 104 may each include an E-UTRAN Node B, also known as Evolved Node B (abbreviated as eNodeB or eNB), or a Next Generation Node B (abbreviated as gNodeB or gNB), which may further include hardware or structural elements that that communicatively couple with a mobile phone network (not shown). In the example illustrated in FIG. 1, CoMP coordination between base stations 104 is performed over an interface 106. In an exemplary embodiment, interface 106 is a dedicated station-to-station communication interface, such as an LTE X2 control plane external interface (X2-CP) disposed between neighboring eNBs 104 and implementing an X2 application protocol (X2-AP).

In the exemplary embodiment, at least one cell 102 (cell 102(1) in this example) includes one or more UEs 108 operating within its cell boundary, serviced by the respective base station 104 thereof (base station 104(1) in this example). UEs 108 may include, for example, functional and/or programmable structural elements, such as a radio resource control (RRC) layer, a MAC layer 112, and a PHY layer (not separately shown). In some embodiments, UE 108 further includes optional hardware or software layers (also not shown), including without limitation, a memory/storage database, a packet data convergence protocol (PDCP) layer, logical channels, transport channels, and/or other programmable processing layers. In a similar manner, base station 104 may include one or more corresponding functional and/or programmable structural elements (also not shown), such as an RRC layer, a MAC layer, and a PHY layer.

In exemplary operation of system 100, long-term coordination is implemented in the case where latency is deemed too high to obtain instantaneous channel information from neighboring cells 102. Adjacent base stations 104 are thus configured to coordinate servicing of one or more UEs 108 operating in an overlapping coverage area of adjacent cells 102. In the exemplary embodiment, these coordination operations are CoMP operations, and negotiate one or more of (i) a time interval in which a CoMP operation will occur, and (ii) time and frequency allocations for a target UE 108 during the CoMP operation. Further to this exemplary embodiment, interface 106 obtains respective IDs of the several base stations 104 that form, or are involved in, the CoMP operation.

In the exemplary embodiment, system 100 further coordinates CoMP transmissions for the unlicensed band. Accordingly, in this example, each base station 104 is configured to perform carrier sensing on the wireless medium of the unlicensed band, prior to broadcasting its own transmission. This coordination technique thus represents a significant improvement over conventional techniques, in which a carrier sensing standard is not defined for multiple transmitting points participating in data transmission that cooperatively serves one or more UEs.

In an embodiment, carrier sensing cooperation may be performed according to one or more techniques, including without limitation: (1) channel sensing independently and back-off independently; (2) channel sensing independently and back-off jointly; and (3) channel sensing jointly and back-off jointly. In this example, the carrier sensing operation, including actions performed based on the results of the carrier sensing, is considered to have a relatively low latency requirement, for example, on the order of <10 μs. Under this consideration, CoMP coordination between eNBs 104 over X2 interface 106 may be highly problematic. That is, for this latency value, the anchor eNB (i.e., a selected base station 104, typically representing a high power node, described further below) is not likely capable of indicating, within the required latency limit, that the carrier sensing has cleared and transmission may begin. Similarly, joint channel sensing may also be difficult for CoMP coordination performed over interface 106 as an X2 interface.

In system 100, the back-off operation raises additional concerns. In the case of a back-off operation occurring independently, transmissions from multiple transmission points within system 100 may not align in time domain. In this case, system 100 may be further configured to include an additional mechanism (not shown) to indicate transmission ranking to UEs 108 in a dynamic manner. However, it may be desirable to avoid the need for such additional mechanisms. Accordingly, in an exemplary embodiment, system 100 is configured to perform the channel sensing independently, and the back-off operation jointly.

In an embodiment, channel sensing is performed independently by first assigning a single transmission point as an anchor transmission point (the "anchor") to perform both channel sensing and back-off, that is, one of base stations 104 implementing LBT. In this example, the anchor transmits a short packet containing control information and data (e.g., Physical Downlink Control Channel (PDCCH)/enhanced PDCCH (ePDCCH) and Physical Downlink Shared Channel (PDSCH) for LTE LAA). In response to the short packet transmission, one or more of UEs 108 reply with an ACK. In an exemplary embodiment, the reply ACK is transmitted immediately at the end of the short packet transmission from the anchor.

System 100 is further configured such that other transmission points (e.g., base stations 104 that are not selected as the anchor) monitor transmissions from UEs 108 to detect the ACK responses, and thereby are indirectly able to comprehend the initial transmission from the anchor, that is, using the ACK responses from UEs 108 that are in detectable range of the other transmission points. Once the initial anchor transmission is understood by the other transmission points, CoMP transmission may begin, using coordinated transmissions from all transmission points thereafter in this manner.

Figure 2A:
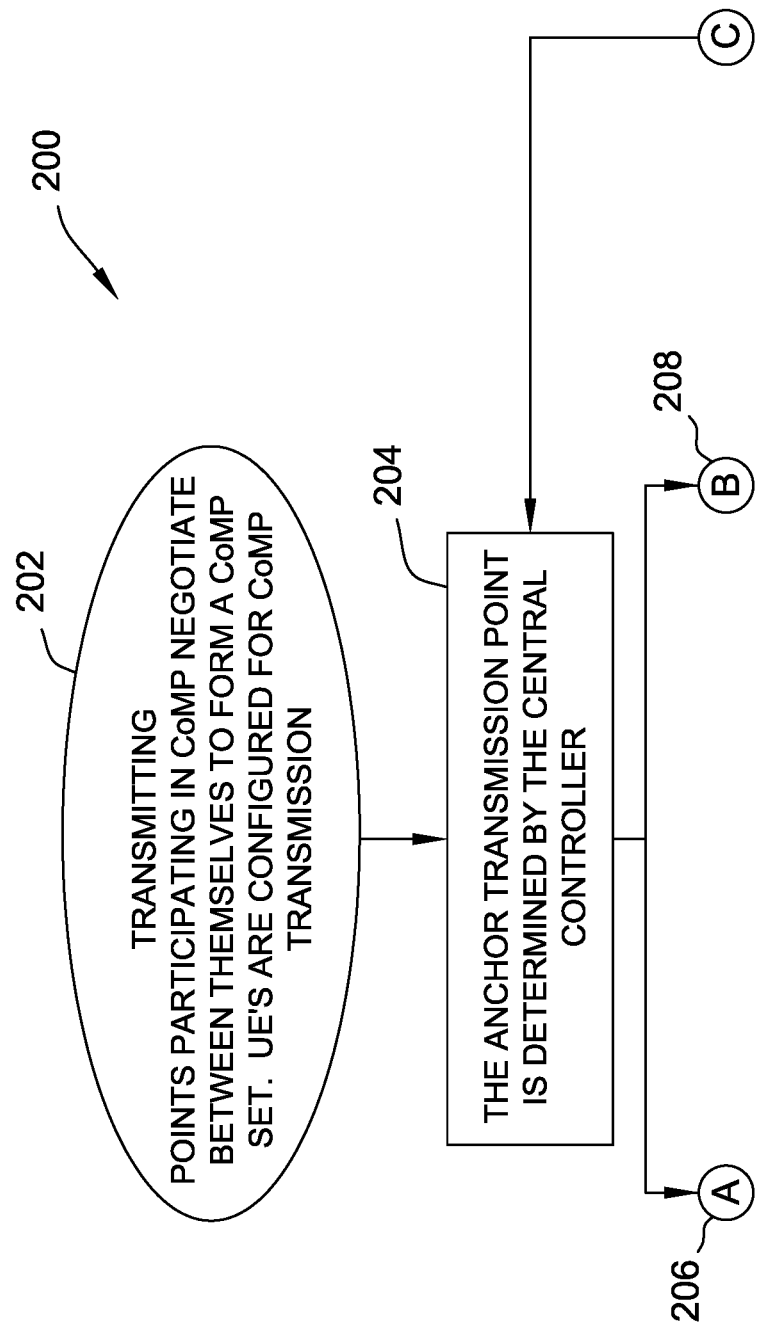
FIGS. 2A-B illustrate a flow chart diagram of an exemplary coordinated multi point transmission process for one or more of the base stations depicted in FIG. 1.
Figure 2B:
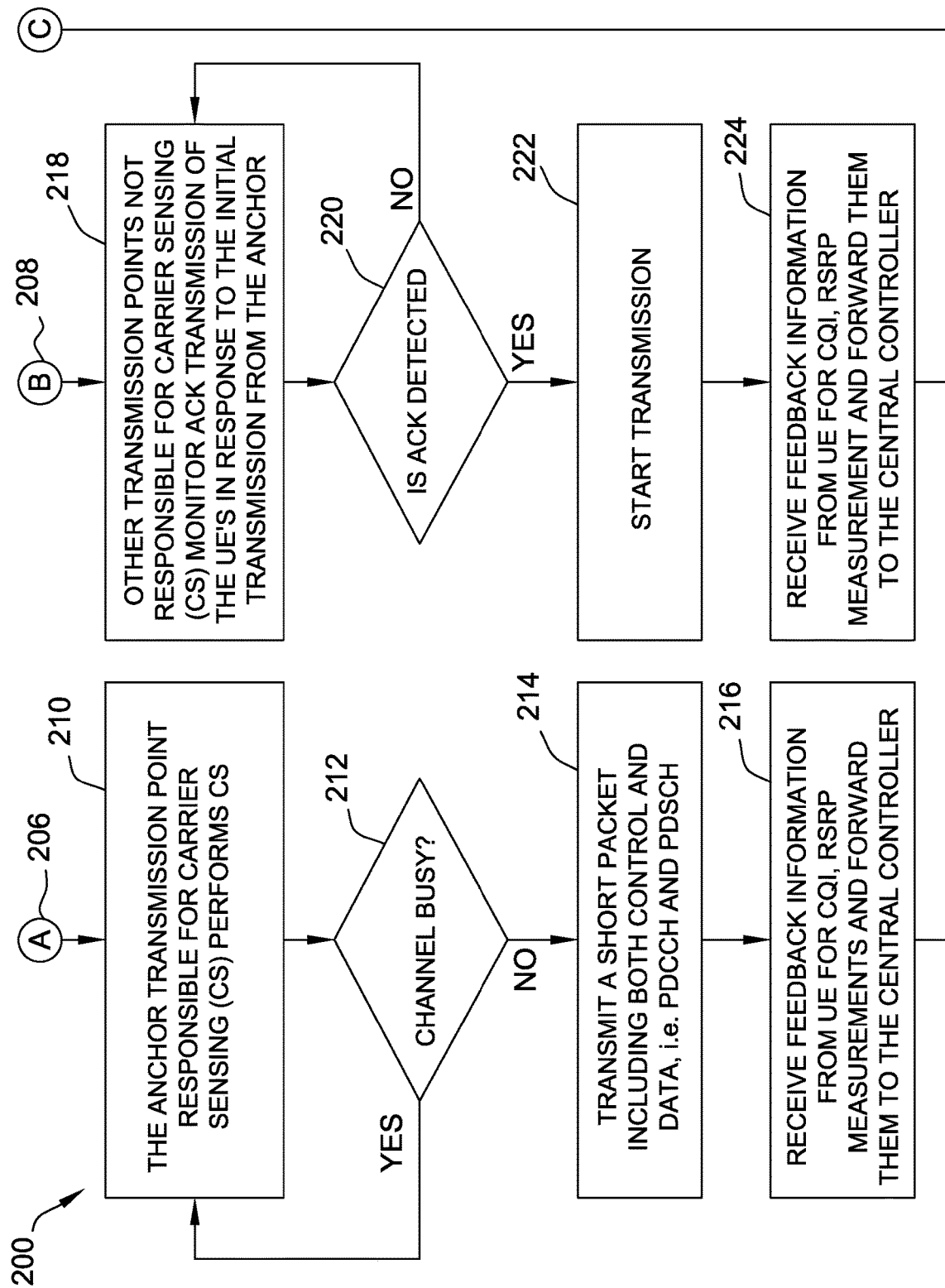

FIGS. 2A-B illustrate a flow chart diagram of an exemplary coordinated multi point transmission process 200 for one or more of base stations 104, FIG. 1. In the exemplary embodiment, process 200 is implemented with respect to an anchor base station 104, and executes a CoMP transmission in the unlicensed band.

In exemplary operation, process 200 begins at step 202, where transmission points (e.g., base stations 104, FIG. 1) participating in CoMP negotiate between themselves to form a CoMP set. In an exemplary embodiment of step 202, UEs 108 within respective cells 102 of the CoMP set are additionally configured for CoMP transmission. In step 204, the anchor transmission point of the CoMP set is selected or determined by a central controller (not separately shown) of system 100. Upon completion of step 204, process 200 proceeds to execute separate subprocesses 206, 208 in parallel. In at least one embodiment, subprocesses 206, 208 are executed simultaneously. In another embodiment, subprocesses 206, 208 are executed sequentially.

Subprocess 206 begins at step 210, in which the anchor transmission point (i.e., the transmission point responsible for carrier sensing) performs carrier sensing on the wireless medium of the channel. Step 212 is a decision step. In step 212, subprocess 206 determines, from the carrier sensing, if the channel is busy. If the channel is determined to be busy, subprocess 206 returns to step 210. If, however, in step 212, subprocess 206 determines that the channel is not busy, subprocess 206 proceeds to step 214. In step 214, the anchor transmits a short packet, including both control and data (e.g., PDCCH, PDSCH). In step 216, the anchor receives feedback information from one or more UEs (e.g., UEs 108, FIG. 1), including without limitation, the channel quality indicator (CQI) and the reference signal received power (RSRP) measurements, and forwards the received feedback information to the central controller.

Subprocess 208 begins at step 218, in which the other transmission points (i.e., transmission points not responsible for carrier sensing) monitor the ACK transmission(s) of UEs 108 that are transmitted in response to the initial transmission from the anchor. Step 220 is a decision step. In step 220, subprocess 208 determines if an ACK is detected. If no ACK is detected, subprocess 208 returns to step 218. If, however, in step 220, subprocess 208 determines that an ACK is detected, subprocess 208 proceeds to step 222. In step 222, the other transmission points begin their respective transmissions in a coordinated manner. In step 224, the other transmission points receive feedback information from detected UEs within range (e.g., CQI, RSRP measurements) and forward the received feedback information to the central controller.

According to techniques described herein, the present systems and methods are a particular advantageous use with respect to base stations/macro base stations operating within LTE, LTE LAA, MuLTEfire, and/or 5G systems operating in unlicensed bands in the multiple points of a CoMP transmission process. According to the present embodiments, a single transmission point (e.g., base station) is selected to perform carrier sensing or LBT, and clear the channel for transmission. The selected transmission point thereby becomes the anchor point. In an exemplary embodiment, selection of the anchor point is determined by the central controller, and based on control feedback from individual UEs (e.g., CQI, RSCP).

Once the anchor transmission point in the CoMP set determines that the channel is clear, the anchor point acquires a transmission opportunity (TxOP) by performing carrier sensing or LBT. After clearing the LBT operation and obtaining the TxOP, the anchor transmission point then begins its transmission with a short packet that includes control information. In the exemplary embodiment, the UEs send an immediate ACK after, or at the end of, the initial transmission from the anchor. Other transmission points in the CoMP set are thereby enabled to align their own transmissions by listening to the ACK messages from the UEs, which include, in the exemplary embodiment, IDs configured for CoMP transmission mode. The other transmission points are thereby enabled to begin their own CoMP transmissions immediately after ACK detection from the UEs configured for CoMP transmission mode.

CoMP Transmission and Remote Radio Heads

The above embodiments described the present systems and methods with respect to CoMP transmissions between neighboring cells having approximately similar base stations/eNBs. The present techniques though, are additionally useful with respect to CoMP transmissions involving the deployment of one or more RRHs about a central base station/eNB.

Figure 3:
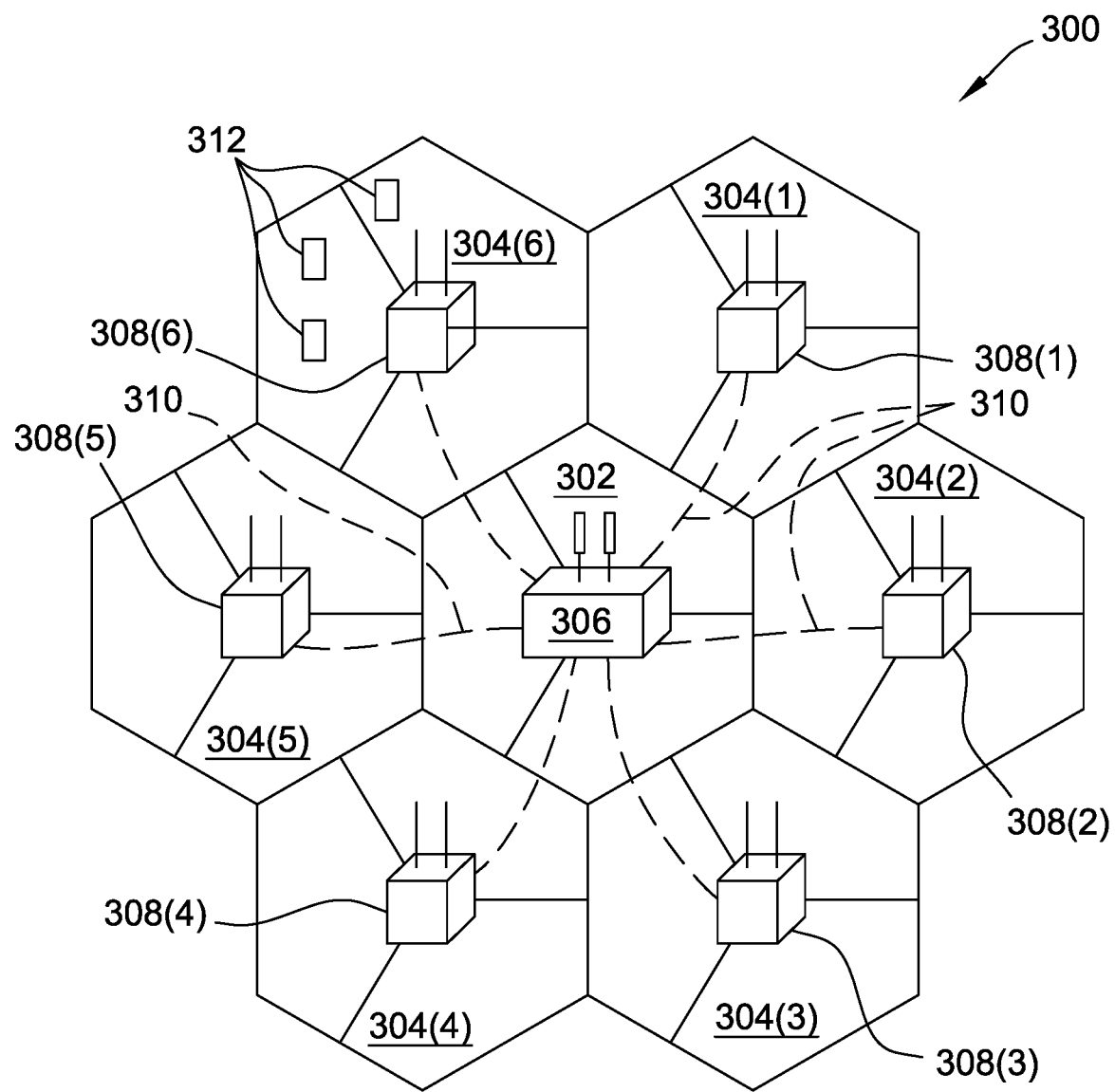
FIG. 3 is a schematic illustration of a communication system implementing inter-cell coordination, in accordance with an alternative embodiment.

FIG. 3 is a schematic illustration of a communication system 300 implementing inter-cell coordination. System 300 includes a central cell 302 about which is disposed plurality of neighboring cells 304. In an exemplary embodiment, central cell 302 includes a macro eNB 306, and each neighboring cell 304 includes a respective RRH 308. RRHs 308 may be, for example, a high-transmission-power are Rh, and may additionally communicate with central eNB 306 over one or more optical fibers 310. In this example, central eNB 306 may be similar in structure and function to one or more of base stations 104, FIG. 1.

In the exemplary embodiment, at least one neighboring cell 304 (cell 304(6) in this example) includes one or more UEs 312 operating within its cell boundary, serviced by the respective RRH 308 thereof (RRH 308(6) in this example). In this example, UEs 312 may be similar, in structure and function, to UEs 108, FIG. 1. Also similar to system 100, and system 300 forms a coordinating CoMP set. However, whereas the CoMP set of system 100 was formed of multiple eNBs (i.e., a stations 104), the CoMP set system 300 is formed of macro eNB 306 and multiple RRHs 308. In an exemplary embodiment, individual processing capability of RRHs 308 may be predetermined, or alternatively, based on the particular implementation and are RRH deployment within system 300.

More particularly, the advantageous architecture of system 300 enables system 302 to configure RRHs in a more versatile manner. For example, an individual RRH 308 may be configured, on one hand, to perform simple radio frequency (RF) down-conversion/up-conversion operations, and then transmit the converted I/Q samples to the central processor. On other hand, an individual RRH 308 may be configured to implement the full PHY/MAC stack (not shown), and relegate the upper layers of the stack to the central processor. Under either alternative (or in between) the advantageous configuration of system 300 enables a significant low latency link between central eNB 306 and RRHs 308. By achieving this low latency link, system 300 is capable of realizing nearly instantaneous channel and control information sharing between cells 302, 304.

In the exemplary embodiment, system 300 further coordinates CoMP transmissions for the unlicensed band. Accordingly, in this example, macro eNB 306 is configured to perform carrier sensing on the wireless medium of the unlicensed band, and prior to transmission. As described above with respect to system 100, carrier sensing operations are not defined and a standard for multiple transmitting points participating in data transmission to cooperatively serve one or more UEs. In this respect, central eNB 306 of system 300 operates similarly to the anchor of system 100.

Therefore, also similar to system 100, in system 300, carrier sensing cooperation may be performed according to one or more the techniques described above, namely: (1) channel sensing independently and back-off independently; (2) channel sensing independently and back-off jointly; and (3) channel sensing jointly and back-off jointly. In this example, the functional operation of system 300 is also subject to the same concerns, described above, in implementing channel sensing and back-off operations.

In exemplary operation of system 300 though, some operational differences from system 100 are provided. For example, to perform channel sensing independently within system 300, eNB 306 and RRHs 308 may be configured to perform channel sensing independently with different sizes of contention windows (CWs). Using these different CW sizes, when and individual RRH 308 is able to determine a lack of traffic on the wireless medium, that particular RRH 308 may be configured to indicate a "clear channel" determination to system 300 by sending a signaling message to central eNB 306. For an independent back-off operation, central eNB 306 may be further configured to indicate (e.g., to central eNB 306 or the central processor) that the channel is "clear for transmission," based on reception of the "clear channel" signal.

In some embodiments, the "clear for transmission" indication is based on reception of a "clear channel" signal from all transmission points (e.g., RRHs 308) in the coordination set/CoMP set. In other embodiments, the "clear for transmission" indication is based on reception of a "clear channel" signal from a single transmission point/RRH 308 or a smaller subset of transmission points fewer than the entirety of neighboring RRHs 308 about central cell 302. Under either alternative, the number of coordination points of the CoMP set used to determine the "clear channel" assessment (e.g., one, some, or all of RRHs 308) may be dynamically adapted, during operation of system 300, based on measured feedback parameters from one or more of UEs 312 (e.g., CQI, RSCP, etc.). With respect to independent back-off operations, similar to system 100, the additional transmission points represented by RRHs 308 may begin transmitting in the substantially simultaneous manner, based on coordinating direction from the central controller, and/or from eNB 306.

Figure 4A:
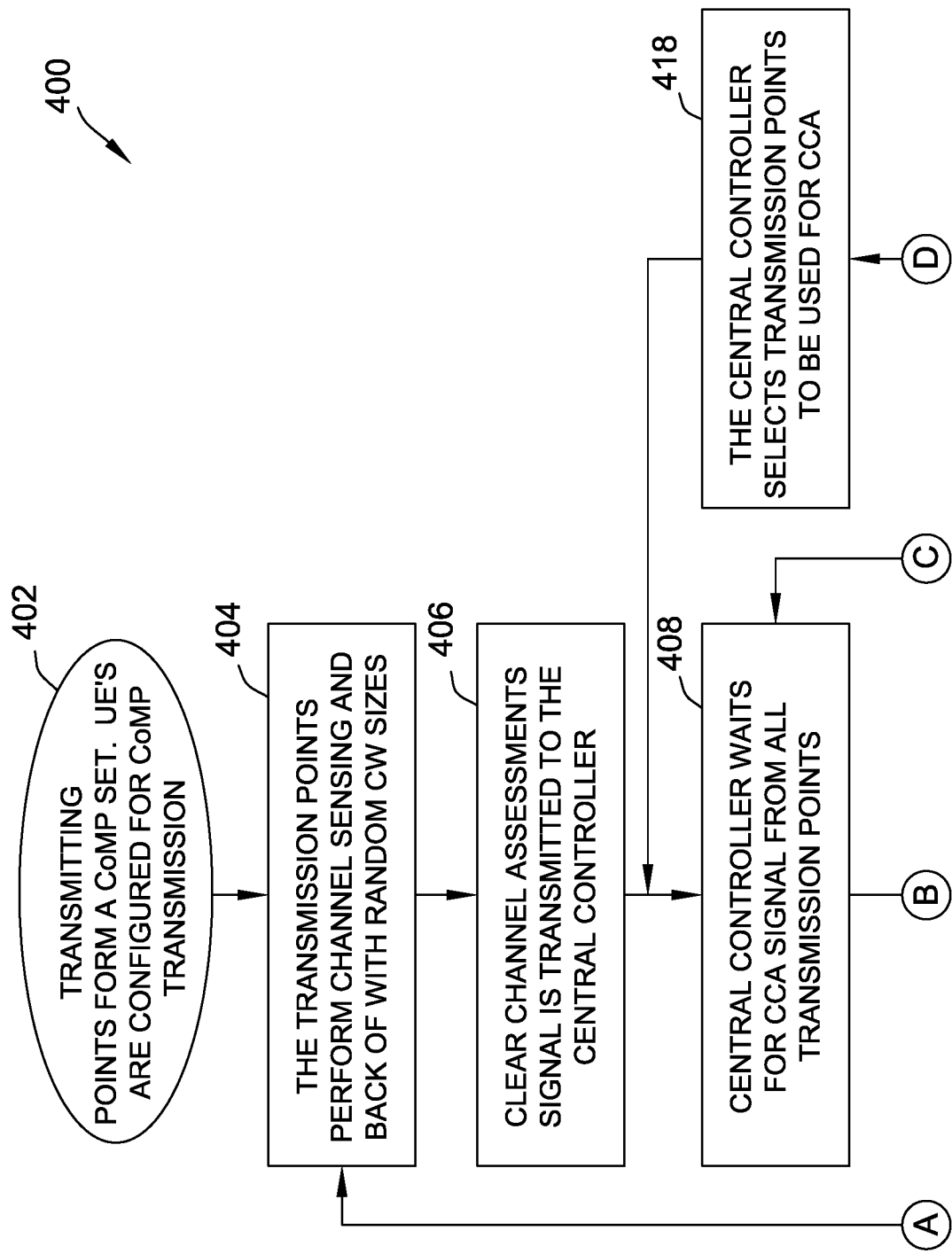
FIGS. 4A-B illustrate a flow chart diagram of an exemplary coordinated multi point transmission process for the communication system depicted in FIG. 3, using independent channel sensing.
Figure 4B:
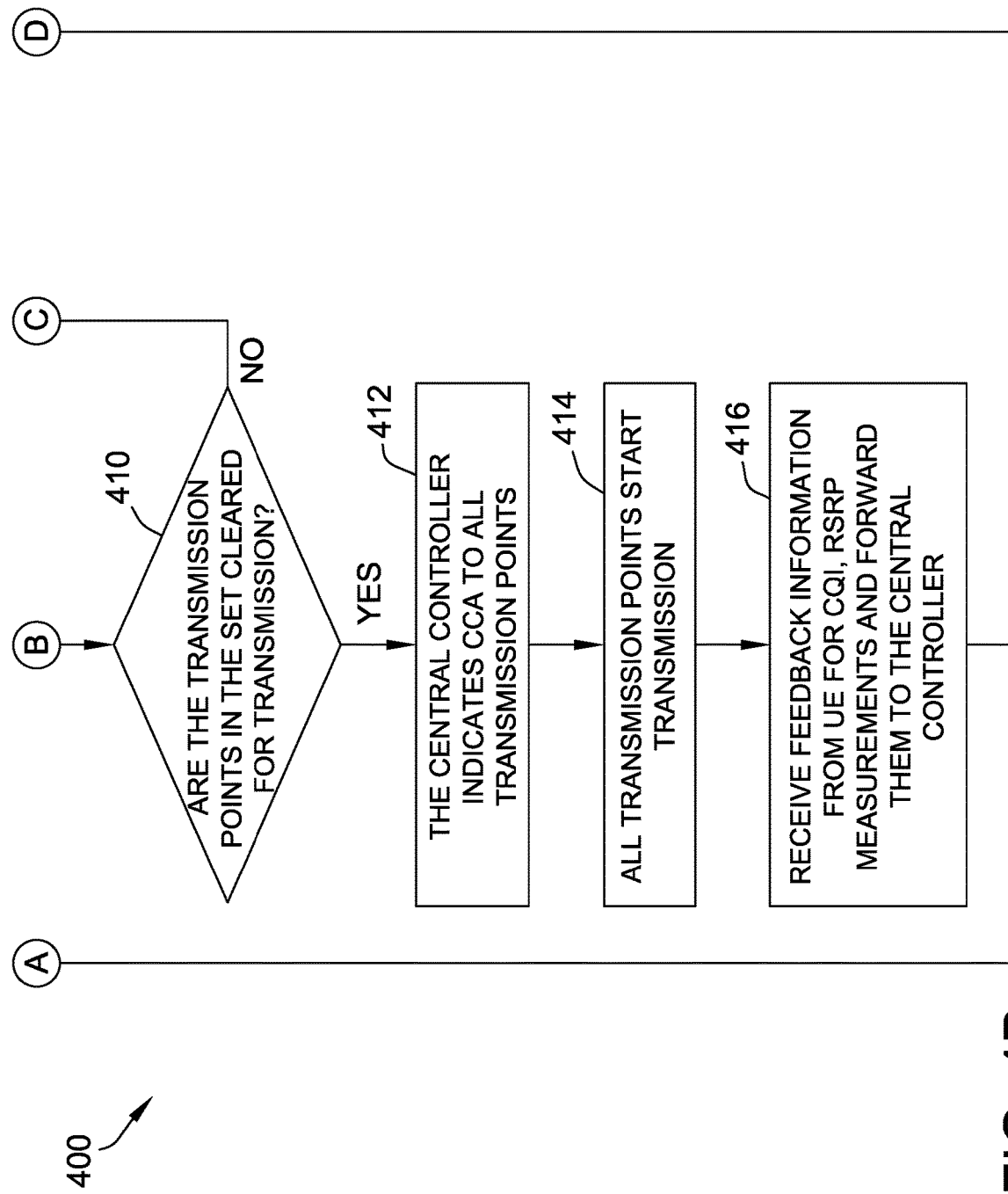

FIGS. 4A-B illustrate a flow chart diagram of an exemplary coordinated multi point transmission process 400 for communication system 300, FIG. 3, using independent channel sensing. In the exemplary embodiment, process 400 manages CoMP transmission for the unlicensed band, and is thus similar in many respects to process 200, FIG. 2. However, whereas process 200 selects one of several base stations/eNBs as the anchor, process 400 operates with respect to a central eNB (e.g., macro eNB 306, FIG. 3), and a plurality of RRHs (e.g., RRHs 308, FIG. 3). In this example, UEs 312 may be configured for CoMP transmission in a similar fashion as UEs 108, FIG. 1.

In exemplary operation, process 400 begins at step 402, in which a CoMP set of transmission points is formed from a central eNB (e.g., eNB 306) and one or more RRHs (e.g., RRHs 308). In an exemplary embodiment of step 402, one or more UEs (e.g., UEs 312) are configured for CoMP transmission at or before this time. In step 404, the several transmission points perform channel sensing and back-off operations. In an exemplary embodiment of step 404, the channel sensing and back-off operations performed by RRH transmission points utilize contention windows having random sizes. In step 406, a "clear channel" assessment (CCA) signal is transmitted to the central controller or central eNB by one or more RRH transmission points. In step 408, the central controller or central eNB waits for the CCA signal from all RRH transmission points in the particular CoMP set (e.g., one, some, or all RRHs).

Step 410 is a decision step. In step 410, process 400 determines if all RRH transmission points in the CoMP set are cleared for transmission. If not all transmission points of the CoMP set are cleared, process 400 returns to step 408. If, however, in step 410, process 400 determines that all relevant transmission points are cleared for transmission, process 400 proceeds to step 412, in which the central controller or central eNB indicates the CCA to all RRH transmission points (e.g., by the "clear for transmission" indication).

In step 414, all relevant RRH transmission points of the particular CoMP set begin their respective transmissions. In step 416, one or more of the transmission points receives feedback information from UE(s) (e.g., CQI, RSRP, etc. measurements) and forwards the received feedback information to the central controller. Upon completion of step 416, process 400 may simultaneously, or in parallel, return to step 406, and also proceed to optional step 418. In step 418, the central controller selects which of the multiple transmission points are to be used for a subsequent CCA. That is, in step 418, process 400 may be configured to reduce the number of transmission points of the CoMP set (i.e., if the previous CCA utilized more than one transmission point), keep the number the same, or increase the number if fewer than all of the neighboring transmission points were used in the previous CCA.

The embodiment described above with respect to FIG. 4 is primarily confined, for ease of explanation, to a case where channel sensing is performed independently. In other cases though, it may be desirable to perform channel sensing jointly. In an exemplary embodiment of joint channel sensing, the several RRHs (as well as other, neighboring eNBs, in the case where the central eNB additionally functions as an anchor for a plurality of adjacent eNBs) perform carrier sensing and share their individual measurements with the central eNB or central controller. In this example, the central eNB may be configured to utilize a single CW size for the back-off mechanism. An exemplary operation of joint channel sensing is described further below with respect to FIG. 5.

Figure 5A:
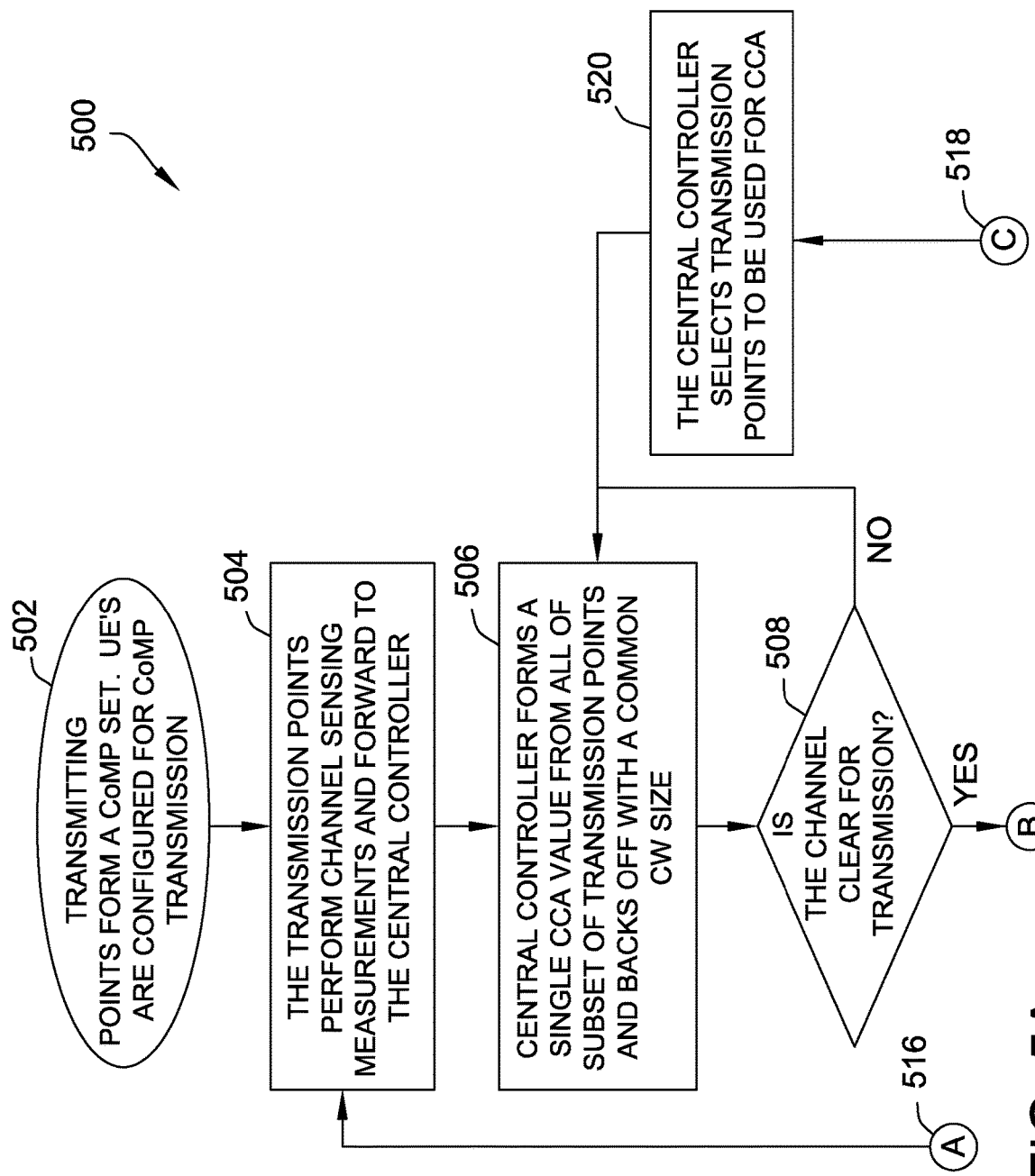
FIGS. 5A-B illustrate a flow chart diagram of an exemplary coordinated multi point transmission process for the communication system depicted in FIG. 3, using joint channel sensing.
Figure 5B:
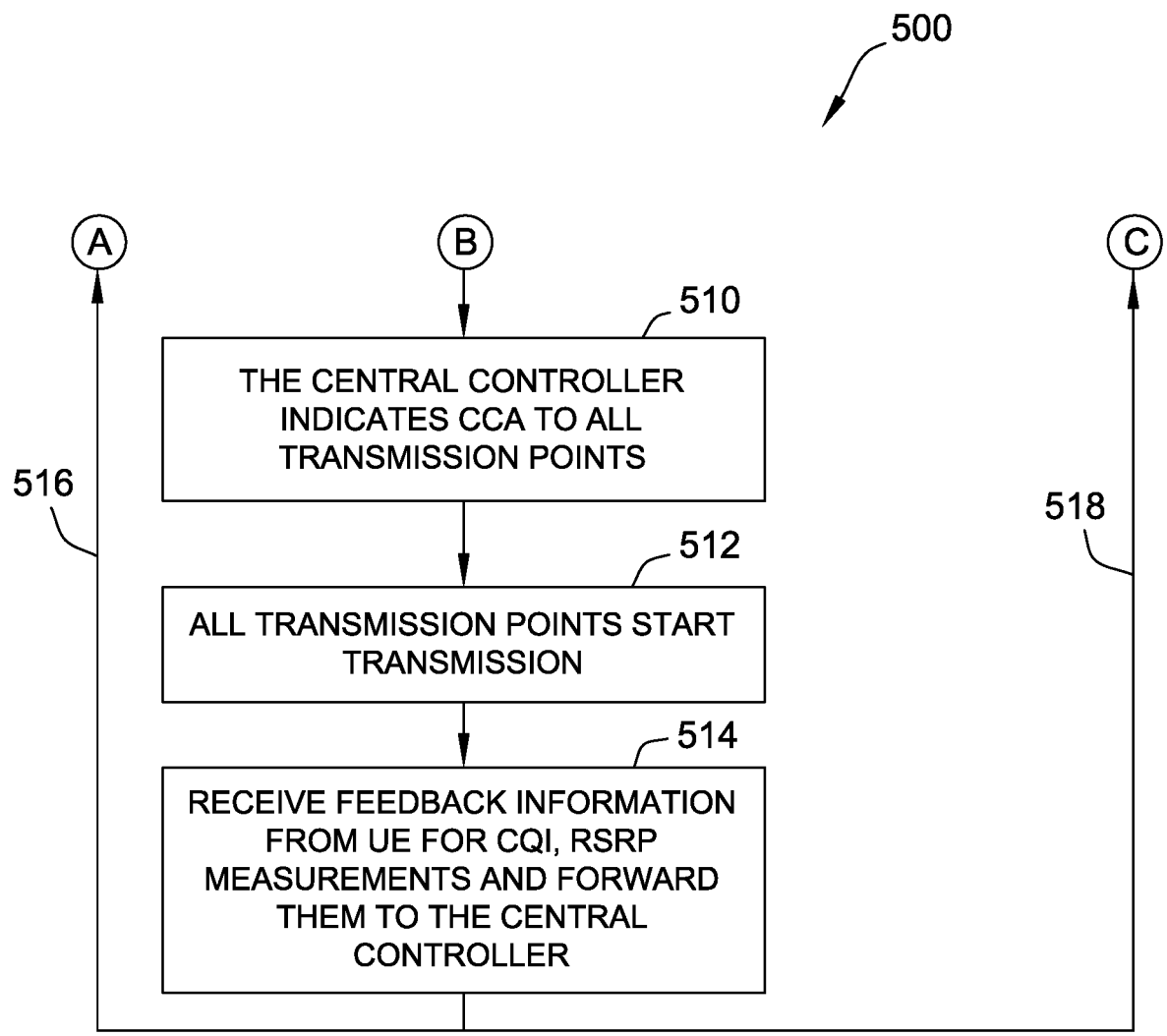

FIGS. 5A-B illustrate a flow chart diagram of an exemplary coordinated multi point transmission process 500 for communication system 300, FIG. 3, using joint channel sensing. In the exemplary embodiment, process 500, similar to process 400, manages CoMP transmission for the unlicensed band, and is described with respect to components similar to those depicted in FIG. 3 (macro eNB 306, RRHs 308, UEs 312, etc.).

In exemplary operation, process 500 begins at step 502, in which a CoMP set of transmission points (e.g., one, some, or all neighboring RRHs), and in which one or more UEs may be configured for CoMP transmission. In step 504, the several transmission points perform channel sensing and back-off operations, and the measurements obtained thereby are forwarded to the central controller or central eNB. In step 506, the central controller/eNB forms a single CCA value from the measurement information received from all transmission points within the relevant CoMP set/subset, and implements a back-off operation using a single, or common, CW size.

Step 508 is a decision step. In step 508, process 500 determines if the wireless medium of the measured channel is clear for transmission. If the channel is determined to not be clear, process 500 returns to step 506. If, however, in step 508, process 500 determines that the channel is clear for transmission, process 500 proceeds to step 510, in which the central controller/eNB indicates the CCA to all transmission points (e.g., by a "clear for transmission" signal). In step 512, all relevant transmission points of the particular CoMP set/subset begin their respective transmissions. In step 514, one or more of the transmission points receives feedback information from respective UE(s) (e.g., CQI, RSRP, etc. measurements) and forwards the received feedback information to the central controller/eNB. Upon completion of step 514, process 500 implements subprocesses 516, 518 simultaneously, or in parallel.

Subprocess 516 includes a return operation, in which process 500 returns to step 504 to begin the next channel sensing measurement operation. Subprocess 518 also includes a return operation, but may further include an intervening optional step 520, in which the central controller/eNB selects which of the multiple transmission points are to be used for a subsequent CCA. That is, in step 520, process 500 may optionally, and dynamically, choose the number of transmission points of the CoMP set for each subsequent CCA to be fewer, the same as, or greater than the number of transmission points used in the previous CCA (that is, with all neighboring transmission points and a single transmission points representing the upper and lower limits of this number). Subprocess 518 then returns to step 506.

According to this exemplary embodiment, the number of CoMP set transmission points used for channel sensing and back-off decisions may include as its coordination set a single transmission point, a subset of only some of the neighboring transmission points, or all of the transmission points surrounding the central eNB/central controller. Through this advantageous configuration, the system (e.g., system 300, FIG. 3) is capable of dynamically adapting the number of transmission points in the CoMP set/subset based on UE feedback, such as CQI and RSCP measurements.

For ease of explanation, the embodiment described above with respect to FIG. 5 addresses an example of jointly performed channel sensing. In other cases though, it may be desirable to perform the joint channel sensing together with long-term adaptation. That is, in some systems, it may be desirable to assign a single transmission point as an anchor to reduce backhaul signaling. In an exemplary embodiment, the single anchor transmission point may be either an RRH or an eNB, and may be predetermined, or dynamically selected by the central processor. An exemplary operation of joint channel sensing with long-term adaptation is described further below with respect to FIG. 6.

Figure 6A:
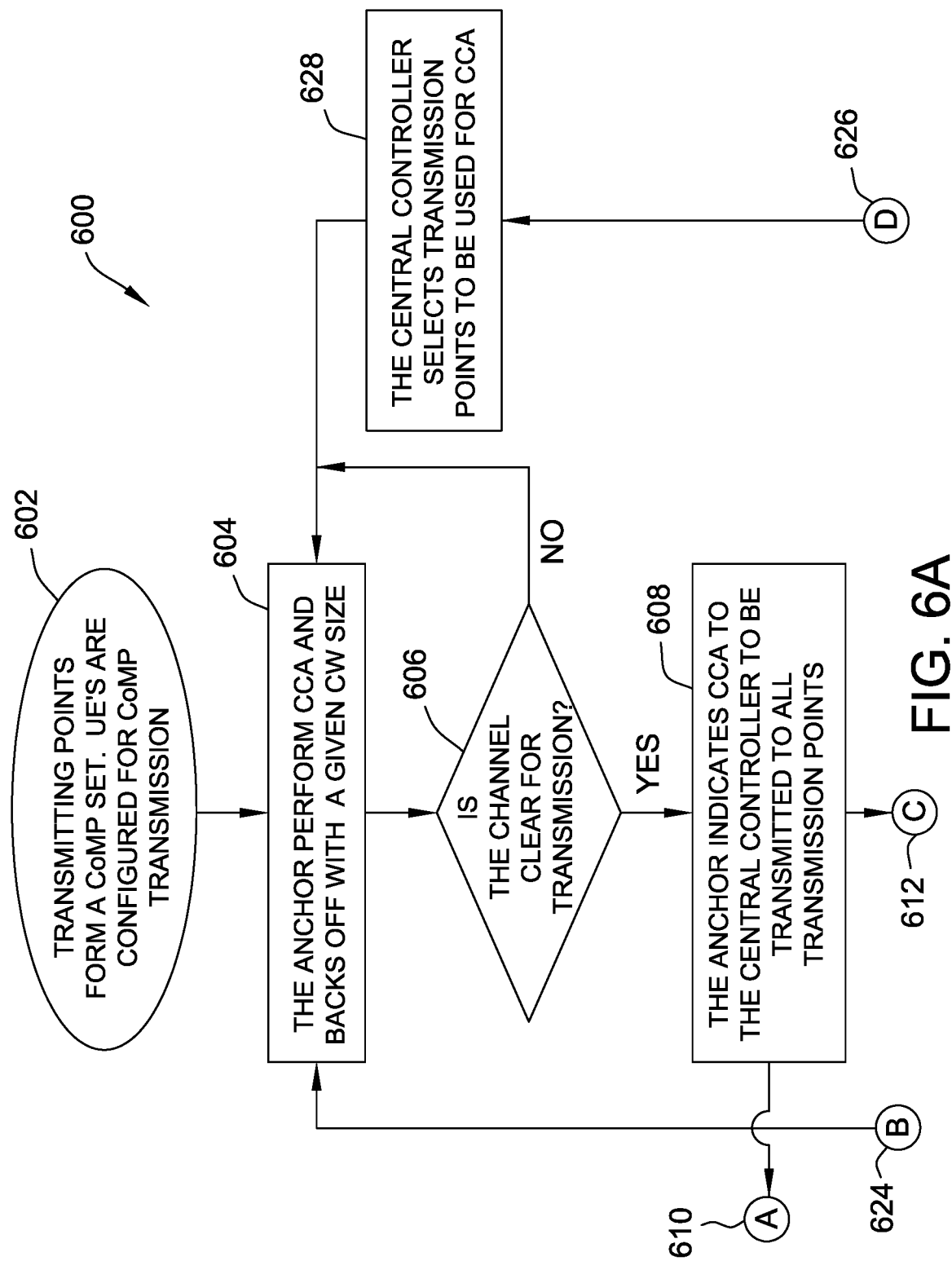
FIGS. 6A-B illustrate a flow chart diagram of an exemplary coordinated multi point transmission process for the communication system depicted in FIG. 3, using joint channel sensing with long-term adaptation.
Figure 6B:
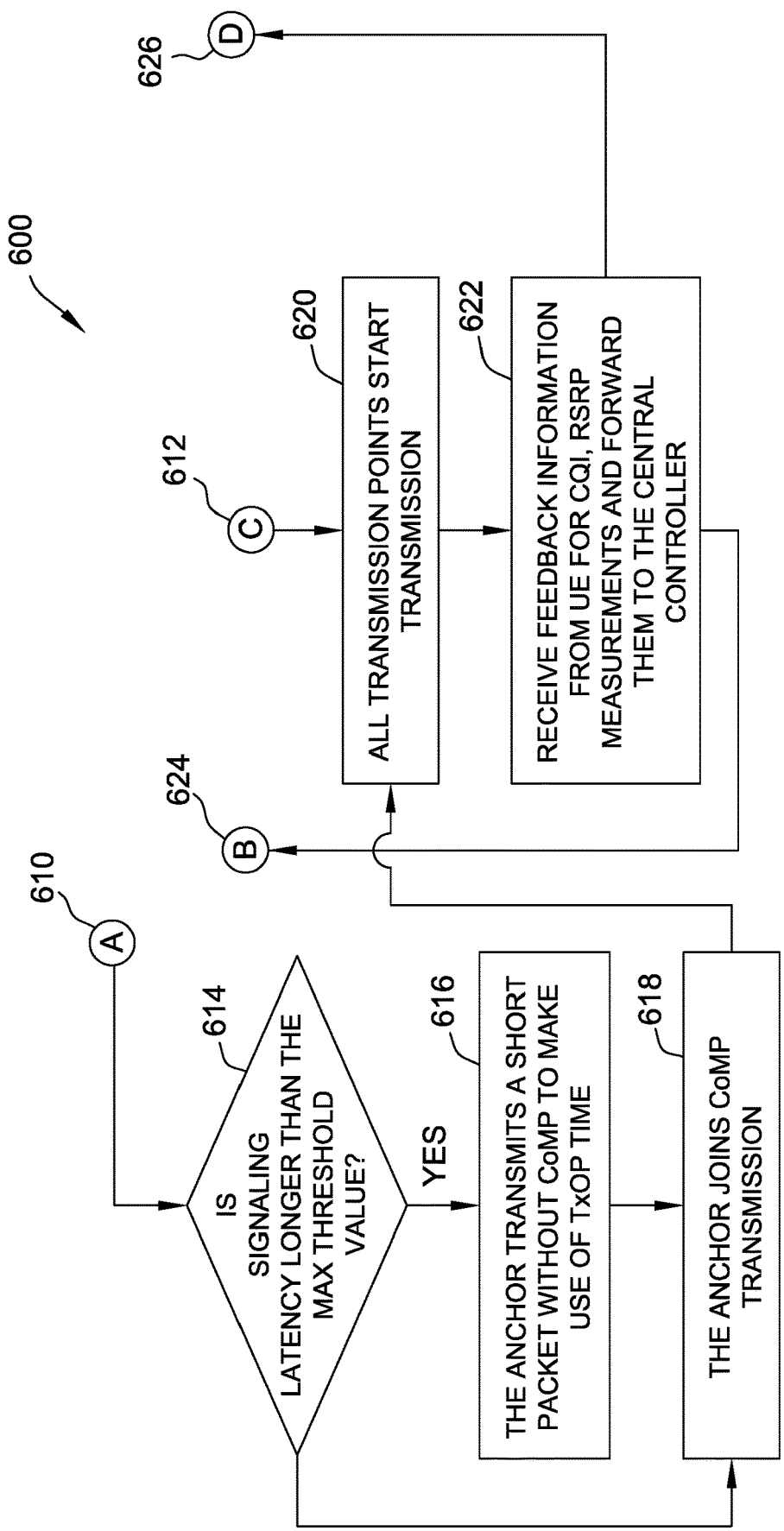

FIGS. 6A-B illustrate a flow chart diagram of an exemplary coordinated multi point transmission process 600 for communication system 300, FIG. 3, using joint channel sensing with long-term adaptation. In the exemplary embodiment, process 600, similar to process 500, manages CoMP transmission for the unlicensed band using joint channel sensing, and is also described with respect to elements similar to those depicted in FIG. 3. Process 600 though, differs from process 500, in that, in process 600, a single anchor is selected/assigned by the central controller to determine whether the channel is clear for transmission. When the channel is clear, the anchor obtains a TxOP, which is then indicated to the central controller to be shared with all transmission points in the CoMP coordination set.

In exemplary operation, process 600 begins at step 602, in which a CoMP set of transmission points (e.g., one, some, or all neighboring RRHs), and in which one or more UEs may be configured for CoMP transmission. In step 604, the selected anchor performs CCA and backs-off using a predetermined CW size.

Step 606 is a decision step. In step 606, process 600 determines if the wireless medium of the measured channel is clear for transmission. If the channel is determined to not be clear, process 600 returns to step 604. If, however, in step 606, process 600 determines that the channel is clear for transmission, process 600 proceeds to step 608, in which the anchor indicates the CCA to the central controller, to then be transmitted to all transmission points (e.g., by a "clear for transmission" signal, and/or the TxOP). Upon completion of step 608, process 600 implements subprocesses 610, 612 simultaneously, or in parallel.

Subprocess 610 begins at step 614. Step 614 is a decision step. In step 614, subprocess 610 determines if signaling latency is longer than the maximum threshold value (e.g., predetermined or dynamically measured). If the channel is determined to be clear, subprocess 610 proceeds to step 616, in which the anchor transmits a short packet without CoMP to maximize the efficiency of the obtained TxOP time. Subprocess 610 then proceeds to step 618, in which the anchor joins the CoMP transmission. If, however, in step 614, subprocess 610 determines that the signaling latency is not longer than the maximum threshold value, subprocess 610 proceeds directly to step 618. After completion of step 618, subprocess 610 joins subprocess 612 at step 620.

Subprocess 612 begins at step 620. In step 620, all relevant transmission points of the particular CoMP set/subset begin their respective transmissions. In step 622, one or more of the transmission points receives feedback information from respective UEs (e.g., CQI, RSRP, etc. measurements) and forwards the received feedback information to the central controller. Upon completion of step 622, process 600 implements subprocesses 624, 628 simultaneously, or in parallel.

Subprocess 624 includes a return operation, in which process 600 returns to step 604, where the anchor executes the next CCA and back-off operation. Subprocess 626 also includes a return operation, but may further include an intervening optional step 628, in which the central controller selects which of the multiple transmission points are to be used for a subsequent CCA. That is, in step 628, subprocess 626 may optionally, and dynamically, choose the number of transmission points of the CoMP set for each subsequent CCA to be fewer, the same as, or greater than the number of transmission points used in the previous CCA. Subprocess 626 then returns to step 604, thus rejoining subprocess 624.

In an exemplary embodiment of process 600, the anchor transmission point is selected by the central controller based on feedback from one or more UEs. According to this advantageous configuration, the central controller may be further configured to schedule resources such that they include a first transport block having a CoMP transmission mode. In some embodiments, central controller may be still further configured to allocate a second, short transport block before the first transport block having a CoMP transmission mode, in the case where it is desirable to allow latency that may be required to communicate the start of transmission to all transmission points in the system.

Exemplary embodiments of systems and methods for CoMP transmissions in the unlicensed band are described above in detail. The systems and methods of this disclosure though, are not limited to only the specific embodiments described herein, but rather, the components and/or steps of their implementation may be utilized independently and separately from other components and/or steps described herein.

Although specific features of various embodiments of the disclosure may be shown in some drawings and not in others, this convention is for convenience purposes and ease of description only. In accordance with the principles of the disclosure, a particular feature shown in a drawing may be referenced and/or claimed in combination with features of the other drawings.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processor capable of executing the functions described herein. The processes described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term "processor."

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A wireless communications system for coordinated multi point transmission over at least one channel of a wireless transmission medium, the system comprising: a central controller, including at least one processor and a memory;
  a first cell region, including a first communications node disposed within the first cell region;
  a plurality of neighboring cell regions disposed about the first cell region, the plurality of neighboring cell regions including a second cell region having a second communications node disposed therein; and
  a plurality of user equipment devices (UEs) disposed within an overlapping region of the first cell region and the second cell region, wherein the plurality of UEs are different from the central controller and the first and second communications nodes, wherein the first communications node is configured to service the plurality of UEs within the first cell region, and wherein the second communications node is configured to service the plurality of UEs within the second cell region,
  wherein the central controller is configured to dynamically select the first communications node to be an anchor transmission point of a coordinated set of transmission points based on control feedback information from the plurality of UEs received by the first communications node and the second communications node,
  wherein the anchor transmission point is configured to perform carrier sensing on the at least one channel for the first and second communication nodes,
  wherein the coordinated set of transmission points comprises the first communications node and the second communications node,
  wherein the first and second communications nodes are (i) in operable communication with the central controller, and (ii) further configured to forward to the central controller the control feedback information received from the plurality of UEs,
  wherein the anchor transmission point is further configured to (i) perform a clear channel assessment determination for the at least one channel (ii) acquire a transmission opportunity as a result of the clear channel assessment determination, and (hi) broadcast a coordinated transmission after acquiring the transmission opportunity,
  wherein the first communications node is further configured to transmit, prior to broadcasting the coordinated transmission, a short packet to the plurality of UEs, wherein the short packet includes control channel information,
  wherein the second communications node is further configured to detect at least one acknowledgement message, in response to the transmitted short packet, from the plurality of UEs, and
  wherein the anchor transmission point is further configured to align the coordinated transmission by the first communications node with the second communications node based on the received at least one acknowledgement message.

2. The system of claim 1, wherein the first communications node comprises a macro base station.

3. The system of claim 2, wherein the macro base station comprises at least one of an evolved node B and a next generation node B.

4. The system of claim 3, wherein the second communications node comprises one of a remote radio head, an evolved node B, and a next generation node B.

5. The system of claim 4, wherein the second communications node is an evolved node B configured to receive the control feedback information from at least one of the plurality of user equipment devices disposed within the second cell region containing the second communications node therein.

6. The system of claim 5, wherein the control feedback information comprises at least one of a channel quality indicator and a reference signal received power measurement.

7. The system of claim 5, wherein the at least one of the plurality of user equipment devices is configured to operate in coordinated multi point transmission mode.

8. The system of claim 5, wherein the at least one of the plurality of user equipment devices is configured to operate according to at least one of a long-term evolution (LTE) protocol and a worldwide interoperability for microwave access protocol.

9. The system of claim 8, wherein the LTE protocol comprises at least one of LTE, LTE license assisted access, unlicensed LTE, MuLTEfire, and LTE WLAN aggregation.

10. The system of claim 5, wherein the at least one of the plurality of user equipment devices is configured to operate according to a Wi-Fi protocol.

11. The system of claim 1, wherein the anchor transmission point is further configured to perform a listen-before-talk operation.

12. The system of claim 1, wherein the central controller includes at least one of a physical layer, a media access control layer, and a radio resource control layer.

13. The system of claim 1, wherein the control channel information includes one or more of physical downlink control channel (PDCCH) data, enhanced physical downlink control channel (ePDCCH) data, and physical downlink shared channel (PDSCH) data.

* * * * *